United States Patent
Laing et al.

(10) Patent No.: US 10,275,715 B2
(45) Date of Patent: *Apr. 30, 2019

(54) CONTROL VARIABLE DETERMINATION TO MAXIMIZE A DRILLING RATE OF PENETRATION

(71) Applicant: SAS Institute Inc., Cary, NC (US)

(72) Inventors: Moray Laing, Spring, TX (US); David Pope, Raleigh, NC (US); Keith R. Holdaway, Raleigh, NC (US); James Duarte, Clermont, FL (US)

(73) Assignee: SAS INSTITUTE INC., Cary, NC (US)

( * ) Notice: Subject to any disclaimer, the term of this patent is extended or adjusted under 35 U.S.C. 154(b) by 1029 days.

This patent is subject to a terminal disclaimer.

(21) Appl. No.: 14/694,427

(22) Filed: Apr. 23, 2015

(65) Prior Publication Data

US 2015/0227841 A1    Aug. 13, 2015

Related U.S. Application Data

(63) Continuation of application No. 14/490,189, filed on Sep. 18, 2014, now Pat. No. 9,085,958.
(Continued)

(51) Int. Cl.
*G06N 5/04*    (2006.01)
*G06N 20/00*    (2019.01)
(Continued)

(52) U.S. Cl.
CPC .............. *G06N 5/04* (2013.01); *E21B 44/00* (2013.01); *E21B 45/00* (2013.01); *E21B 47/12* (2013.01);
(Continued)

(58) Field of Classification Search
None
See application file for complete search history.

(56) References Cited

U.S. PATENT DOCUMENTS 8,121,971 B2 *   2/2012   Edwards ................ G06N 5/025
                                                              706/48
8,170,800 B2     5/2012   Aamodt et al.
(Continued)

FOREIGN PATENT DOCUMENTS

CN    102395754 A    3/2012
CN    102822752 A    12/2012

OTHER PUBLICATIONS

DataFlux Event Stream Processing Engine User's Guide, Version 1.3, Jan. 24, 2013.
(Continued)

*Primary Examiner* — Tung S Lau
(74) *Attorney, Agent, or Firm* — Bell & Manning, LLC

(57) ABSTRACT

A computing device configured to determine an optimal value for a control of a drilling operation is provided. An event stream processing engine (ESPE) instantiated. The ESPE is instantiated to execute an objective function model determined using historical drilling data. The objective function model maximizes a rate of penetration for a previous drilling operation. The historical drilling data includes a plurality of values measured for each of a plurality of drilling control variables during the previous drilling operation. Measured drilling data that includes current drilling data values for a current drilling operation is received by the ESPE. The received, measured drilling data is processed through the ESPE instantiated to execute the objective function model to determine an optimal value for a control of the current drilling operation. The determined optimal value is output by the ESPE for the control of the current drilling operation.

30 Claims, 9 Drawing Sheets

Related U.S. Application Data

(60) Provisional application No. 61/879,933, filed on Sep. 19, 2013.

(51) Int. Cl.
*E21B 44/00* (2006.01)
*E21B 45/00* (2006.01)
*E21B 49/00* (2006.01)
*G01V 13/00* (2006.01)
*E21B 47/12* (2012.01)

(52) U.S. Cl.
CPC ............ *E21B 49/003* (2013.01); *G01V 13/00* (2013.01); *G06N 20/00* (2019.01)

(56) References Cited

U.S. PATENT DOCUMENTS

| | | | |
|---|---|---|---|
| 8,453,764 B2 | 6/2013 | Turner et al. | |
| 8,794,353 B2 | 8/2014 | Benson et al. | |
| 9,085,958 B2 * | 7/2015 | Laing | E21B 49/003 |
| 9,317,537 B2 * | 4/2016 | Fakeih | G06F 17/30289 |
| 2010/0259415 A1 * | 10/2010 | Strachan | E21B 44/00 340/853.6 |
| 2011/0174541 A1 * | 7/2011 | Strachan | E21B 44/00 175/27 |
| 2012/0118637 A1 * | 5/2012 | Wang | E21B 44/00 175/24 |
| 2012/0123756 A1 * | 5/2012 | Wang | E21B 44/00 703/2 |
| 2015/0354336 A1 | 12/2015 | Maurice et al. | |
| 2016/0017696 A1 * | 1/2016 | Srinivasan | E21B 44/00 703/10 |

OTHER PUBLICATIONS

Coopersmith, E. et al., "Making Decisions in the Oil and Gas Industry," Oil Field Review (Winter 2000/2001) pp. 2-9.

Cotton, S. et al., "Advanced process controls cuts offshore production constraints," Oil & Gas Journal (Jan. 17, 2005) vol. 103, No. 3, 12 pp.

* cited by examiner

CONTROL VARIABLE DETERMINATION TO MAXIMIZE A DRILLING RATE OF PENETRATION

CROSS-REFERENCE TO RELATED APPLICATIONS

The present application is a continuation of U.S. patent application Ser. No. 14/490,189, filed on Sep. 18, 2014, the entire contents of which are hereby incorporated by reference. U.S. patent application Ser. No. 14/490,189 claims the benefit of 35 U.S.C. § 119(e) to U.S. Provisional Patent Application No. 61/879,933 filed on Sep. 19, 2013, the entire contents of which is also hereby incorporated by reference.

BACKGROUND

Drilling holes of all types and sizes for various industries (water, natural gas, oil, construction, telecommunications, electric, etc.) in various environments (land, frozen land, seabed, deep seabed, etc.) can be a complex, expensive, and risky process.

SUMMARY

In an example embodiment, a method of determining an optimal value for a control of a drilling operation is provided. An event stream processing engine (ESPE) instantiated. The ESPE is instantiated to execute an objective function model determined using historical drilling data. The objective function model maximizes a rate of penetration for a previous drilling operation. The historical drilling data includes a plurality of values measured for each of a plurality of drilling control variables during the previous drilling operation. Measured drilling data that includes current drilling data values for a current drilling operation is received by the ESPE. The received, measured drilling data is processed through the ESPE instantiated to execute the objective function model to determine an optimal value for a control of the current drilling operation. The determined optimal value is output by the ESPE for the control of the current drilling operation.

In another example embodiment, a computer-readable medium is provided having stored thereon computer-readable instructions that, when executed by a computing device, cause the computing device to perform the method of determining an optimal value for a control of a drilling operation.

In yet another example embodiment, a computing device is provided. The computing device includes, but is not limited to, a processor and a computer-readable medium operably coupled to the processor. The computer-readable medium has instructions stored thereon that, when executed by the computing device, cause the computing device to perform the method of determining an optimal value for a control of a drilling operation.

These and other embodiments can optionally include one or more of the following features. The objective function model can be determined using a neural network model. The objective function model can be determined by evaluating a plurality of neural network model configurations. The instructions for determining the objective function model can include: defining a training dataset as a first portion of the received drilling data; defining a validation dataset as a second portion of the received drilling data; defining a first neural network model configuration; training a first neural network model using the defined training dataset based on the defined first neural network model configuration; predicting model output data with the defined validation dataset as an input to the trained first neural network model; comparing the predicted model output data to output data of the validation dataset; and determining a first validity score for the trained first neural network model based on comparing the predicted model output data to output data of the validation dataset. The instructions for determining the objective function model may also include: defining a second neural network model configuration; training a second neural network model using the defined training dataset based on the defined second neural network model configuration; predicting second model output data with the defined validation dataset as an input to the trained second neural network model; comparing the predicted second model output data to the output data of the validation dataset; and determining a second validity score for the trained second neural network model based on comparing the predicted second model output data to the output data of the validation dataset. The objective function model can be determined as the trained first neural network model or the trained second neural network model based on a comparison between the determined first validity score and the determined second validity score. A predictive model can be determined using the received drilling data, for which the predictive model can predict a value of a control variable input to the determined objective function model. The computer-readable instructions can also cause the computing device to determine a current predicted value of the control variable input to the determined objective function model, for which the determined objective function model can be further executed with the current predicted value as an input. The predictive model can be determined using a decision tree model. The computer-readable instructions can also cause the computing device to: receive additional drilling data, for which the additional drilling data includes a second plurality of values measured for each of the plurality of drilling control variables, and the additional drilling data is measured after outputting the determined optimal value for the control of the drilling operation; determine a second objective function model using the received additional drilling data, for which the second objective function model maximizes a rate of penetration of the drilling operation; receive second measured drilling data that includes second current drilling data values for the different drilling operation; determine a second optimal value for the control of the different drilling operation by executing the determined second objective function model with the second measured drilling data that includes the second current drilling data values for the different drilling operation as an input; and output the determined second optimal value for the control of the different drilling operation. The received drilling data may include a second plurality of values measured for each of the plurality of drilling control variables during the different drilling operation. The objective function model can also minimize a mechanical specific energy for the drilling operation. The objective function model can also optimize the wellbore stability for the drilling operation. The objective function model can also optimize the wellbore stability of the drilling operation. The determined optimal value can be outputted to a display device. The determined optimal value can be outputted to a control device associated with adjusting a set point of the control. The computing device may be physically located on a drilling rig. In other embodiments, the computing device may be physically remote from the drilling rig.

Other principal features of the disclosed subject matter will become apparent to those skilled in the art upon review of the following drawings, the detailed description, and the appended claims.

BRIEF DESCRIPTION OF THE DRAWINGS

Illustrative embodiments of the disclosed subject matter will hereafter be described referring to the accompanying drawings, wherein like numerals denote like elements.

DETAILED DESCRIPTION

Figure 1:
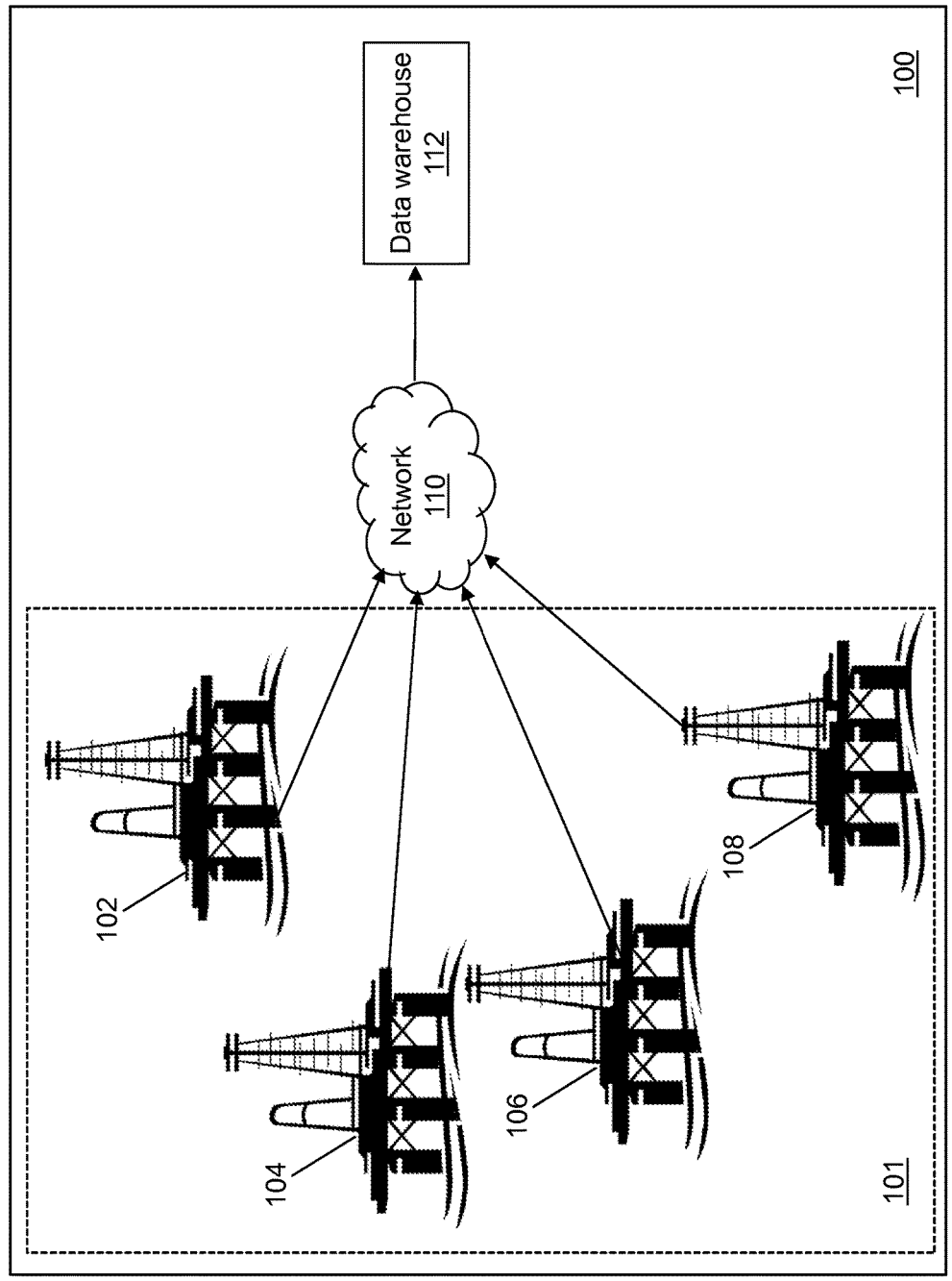
FIG. 1 depicts a block diagram of a drilling data gathering system in accordance with an illustrative embodiment.

Referring to FIG. 1, a block diagram of a drilling data gathering system 100 is shown in accordance with an illustrative embodiment. Drilling data gathering system 100 may include a plurality of drilling rigs 101, a network 110, and a data warehouse 112. Fewer, different, and/or additional components may be incorporated into drilling data gathering system 100. For illustration, the plurality of drilling rigs 101 may include a first drilling rig 102, a second drilling rig 104, a third drilling rig 1066, a fourth drilling rig 108. The plurality of drilling rigs 101 may include any number of drilling rigs. A drilling rig of the plurality of drilling rigs 101 may be active or inactive. The plurality of drilling rigs 101 may be configured to drill holes of any type and size for various industries (e.g., water, natural gas, oil, construction, telecommunications, electric, etc.) in various environments (e.g., land, frozen land, seabed, deep seabed, etc.). The plurality of drilling rigs 101 may be distributed locally, regionally, or globally.

Network 110 may include one or more networks of the same or different types. Network 110 can be any type or combination of wired and/or wireless public or private network including a cellular network, a local area network, a wide area network such as the Internet, etc. Network 110 further may comprise sub-networks and consist of any number of devices. The plurality of drilling rigs 101 send communications through network 110 to data warehouse 112. The plurality of drilling rigs 101 may communicate using various transmission media that may be wired and/or wireless as understood by those skilled in the art.

Data warehouse 112 stores drilling data from the plurality of drilling rigs 101 that includes a plurality of values measured for each of a plurality of drilling control variables (dependent or target variables for predictive modeling) during a hole or well drilling operation. The plurality of values may be measured for each of the plurality of drilling control variables at a plurality of time points during a time period. For example, the plurality of values may be measured for each of the plurality of drilling control variables hourly for a year-long time period though other time period lengths and measurement intervals may be used.

Figure 2:
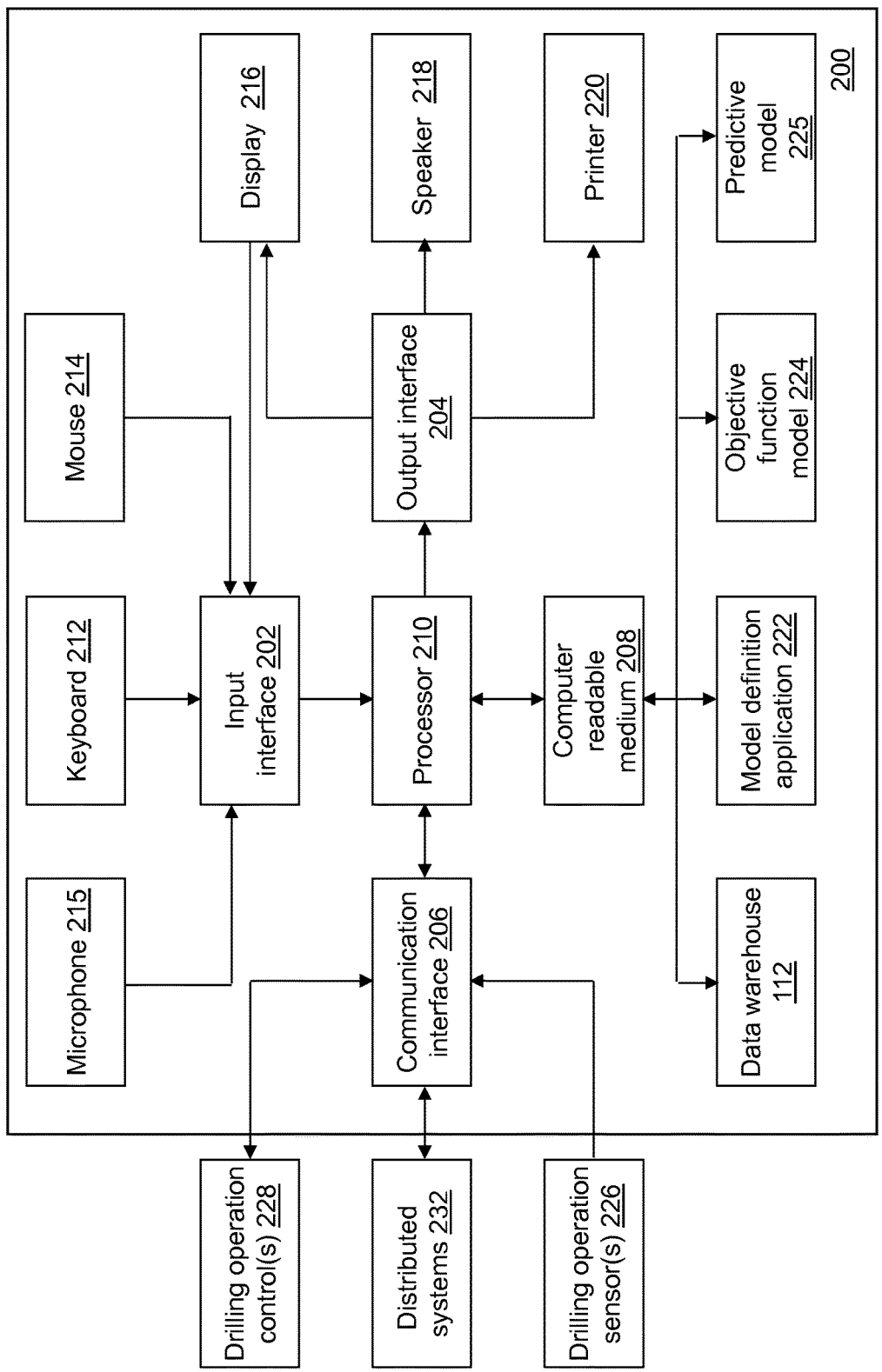
FIG. 2 depicts a block diagram of a model definition device in accordance with an illustrative embodiment.

Referring to FIG. 2, a block diagram of a model definition device 200 is shown in accordance with an illustrative embodiment. Model definition device 200 may be located on a drilling rig of the plurality of drilling rigs 101 or remote from the plurality of drilling rigs 101. Model definition device 200 may include an input interface 202, an output interface 204, a communication interface 206, a computer-readable medium 208, a processor 210, a model definition application 222, data warehouse 112, an objective function model 224, and a predictive model 225. Fewer, different, and/or additional components may be incorporated into model definition device 200.

Input interface 202 provides an interface for receiving information from the user for entry into model definition device 200 as understood by those skilled in the art. Input interface 202 may interface with various input technologies including, but not limited to, a keyboard 212, a mouse 214, a microphone 215, a display 216, a track ball, a keypad, one or more buttons, etc. to allow the user to enter information into model definition device 200 or to make selections presented in a user interface displayed on the display. The same interface may support both input interface 202 and output interface 204. For example, display 216 comprising a touch screen provides user input and presents output to the user. Model definition device 200 may have one or more input interfaces that use the same or a different input interface technology. The input interface technology further may be accessible by model definition device 200 through communication interface 206.

Output interface 204 provides an interface for outputting information for review by a user of model definition device 200 and/or for use by another application. For example, output interface 204 may interface with various output technologies including, but not limited to, display 216, a speaker 218, a printer 220, etc. Model definition device 200 may have one or more output interfaces that use the same or a different output interface technology. The output interface technology further may be accessible by model definition device 200 through communication interface 206.

Communication interface 206 provides an interface for receiving and transmitting data between devices using various protocols, transmission technologies, and media as understood by those skilled in the art. Communication interface 206 may support communication using various transmission media that may be wired and/or wireless. Model definition device 200 may have one or more communication interfaces that use the same or a different communication interface technology. For example, model definition device 200 may support communication using an Ethernet port, a Bluetooth antenna, a telephone jack, a USB port, etc. Data and messages may be transferred between model definition device 200 and/or distributed systems 232, one or more drilling operation sensors 226, and/or one or more drilling operation control parameters 228 of the plurality of drilling rigs 101 using communication interface 206.

Computer-readable medium 208 is an electronic holding place or storage for information so the information can be accessed by processor 210 as understood by those skilled in the art. Computer-readable medium 208 can include, but is not limited to, any type of random access memory (RAM), any type of read only memory (ROM), any type of flash memory, etc. such as magnetic storage devices (e.g., hard disk, floppy disk, magnetic strips, . . . ), optical disks (e.g., compact disc (CD), digital versatile disc (DVD), . . . ), smart cards, flash memory devices, etc. Model definition device 200 may have one or more computer-readable media that use the same or a different memory media technology. For example, computer-readable medium 208 may include different types of computer-readable media that may be organized hierarchically to provide efficient access to the data stored therein as understood by a person of skill in the art. As an example, a cache may be implemented in a smaller, faster memory that stores copies of data from the most frequently/recently accessed main memory locations to reduce an access latency. Model definition device 200 also may have one or more drives that support the loading of a memory media such as a CD, DVD, an external hard drive, etc. One or more external hard drives further may be connected to model definition device 200 using communication interface 206.

Processor 210 executes instructions as understood by those skilled in the art. The instructions may be carried out by a special purpose computer, logic circuits, or hardware circuits. Processor 210 may be implemented in hardware and/or firmware. Processor 210 executes an instruction, meaning it performs/controls the operations called for by that instruction. The term "execution" is the process of running an application or the carrying out of the operation called for by an instruction. The instructions may be written using one or more programming language, scripting language, assembly language, etc. Processor 210 operably couples with input interface 202, with output interface 204, with communication interface 206, and with computer-readable medium 208 to receive, to send, and to process information. Processor 210 may retrieve a set of instructions from a permanent memory device and copy the instructions in an executable form to a temporary memory device that is generally some form of RAM. Model definition device 200 may include a plurality of processors that use the same or a different processing technology.

Model definition application 222 performs operations associated with defining objective function model 224 and/or predictive model 225 for one or more drilling operation from data stored in data warehouse 112. Some or all of the operations described herein may be embodied in model definition application 222. The operations may be implemented using hardware, firmware, software, or any combination of these methods. Referring to the example embodiment of FIG. 2, model definition application 222 is implemented in software (comprised of computer-readable and/or computer-executable instructions) stored in computer-readable medium 208 and accessible by processor 210 for execution of the instructions that embody the operations of model definition application 222. Model definition application 222 may be written using one or more programming languages, assembly languages, scripting languages, etc.

Model definition application 222 may be implemented as a Web application. For example, model definition application 222 may be configured to receive hypertext transport protocol (HTTP) responses and to send HTTP requests. The HTTP responses may include web pages such as hypertext markup language (HTML) documents and linked objects generated in response to the HTTP requests. Each web page may be identified by a uniform resource locator (URL) that includes the location or address of the computing device that contains the resource to be accessed in addition to the location of the resource on that computing device. The type of file or resource depends on the Internet application protocol such as the file transfer protocol, HTTP, H.323, etc. The file accessed may be a simple text file, an image file, an audio file, a video file, an executable, a common gateway interface application, a Java applet, an extensible markup language (XML) file, or any other type of file supported by HTTP.

Data warehouse 112 may be stored in computer-readable medium 208 or on one or more computing devices (e.g., distributed systems 232) and accessed using communication interface 206. The data stored in data warehouse 112 may be received from the one or more drilling operation sensors 226. Example sensors include pressure sensors, temperature sensors, position sensors, velocity sensors, acceleration sensors, flow rate sensors, etc. that may be mounted to various components used as part of the drilling operation. For example, the one or more drilling operation sensors 226 may include surface sensors that measure a hook load, a fluid rate, a temperature and a density in and out of the wellbore, a standpipe pressure, a surface torque, a rotation speed of a drill pipe, a rate of penetration, a mechanical specific energy, etc. and downhole sensors that measure a rotation speed of a bit, fluid densities, downhole torque, downhole vibration (axial, tangential, lateral), a weight applied at a drill bit, an annular pressure, a differential pressure, an azimuth, an inclination, a dog leg severity, a measured depth, a vertical depth, a downhole temperature, etc. Other data may include the one or more drilling operation control parameters 228 may control settings such as a mud motor speed to flow ratio, a bit diameter, a predicted formation top, seismic data, weather data, etc. Other data may be generated using physical models such as an earth model, a weather model, a seismic model, a bottom hole assembly model, a well plan model, an annular friction model, etc. In addition to sensor and control settings, predicted outputs, of for example, the rate of penetration, mechanical specific energy, hook load, flow in fluid rate, flow out fluid rate, pump pressure, surface torque, rotation speed of the drill pipe, annular pressure, annular friction pressure, annular temperature, equivalent circulating density, etc. may also be stored in the data warehouse.

The plurality of values may be measured from the same drilling operation, from one or more neighboring drilling operations, from one or more drilling operations with similar geological characteristics, from any of one or more drilling operations, etc. For example, a drilling operation in an environment with a similar permeability and porosity may be used. The plurality of values may result from control control variable values chosen by an operator during a previous time period on the same or a different drilling operation.

The data stored in data warehouse 112 may include any type of content represented in any computer-readable format such as binary, alphanumeric, numeric, string, markup language, etc. The content may include textual information, graphical information, image information, audio information, numeric information, etc. that further may be encoded using various encoding techniques as understood by a person of skill in the art. Data warehouse 112 may be stored using various formats as known to those skilled in the art including a file system, a relational database, a system of tables, a structured query language database, etc. For example, data warehouse 112 may be stored in a cube distributed across a grid of computers as understood by a person of skill in the art. As another example, data warehouse 112 may be stored in a multi-node Hadoop® cluster, as understood by a person of skill in the art. Apache™ Hadoop® is an open-source software framework for distributed computing supported by the Apache Software Foundation. As another example, data warehouse 112 may be stored in a cloud of computers and accessed using cloud computing technologies, as understood by a person of skill in the art. The SAS® LASR™ Analytic Server developed and provided by SAS Institute Inc. of Cary, N.C., USA may be used as an analytic platform to enable multiple users to concurrently access data stored in data warehouse 112.

If data warehouse 112 is distributed across distributed systems 232, a distributed processing system can be used. For illustration, the distributed processing system may be implemented using a multi-node Hadoop® cluster, using a grid of computers storing a cube of data, using the SAS® LASR™ Analytic Server, using cloud of computers, etc. as understood by a person of skill in the art. For example, a distributed control device may coordinate access to data warehouse 112 distributed across distributed systems 232 when requested by model definition device 200. One or more components of the distributed processing system may support multithreading, as understood by a person of skill in the art. The components of the distributed processing system may be located in a single room or adjacent rooms, in a single facility, and/or may be distributed geographically from one another.

The data in data warehouse 112 may be cleansed to impute missing values, smooth noisy data, identify and remove outliers, and/or resolve inconsistencies as understood by a person of skill in the art. The data in data warehouse 112 may be transformed to normalize and aggregate the data, to unify data formats such as dates, and to convert nominal data types to numeric data types as understood by a person of skill in the art.

Figure 3:
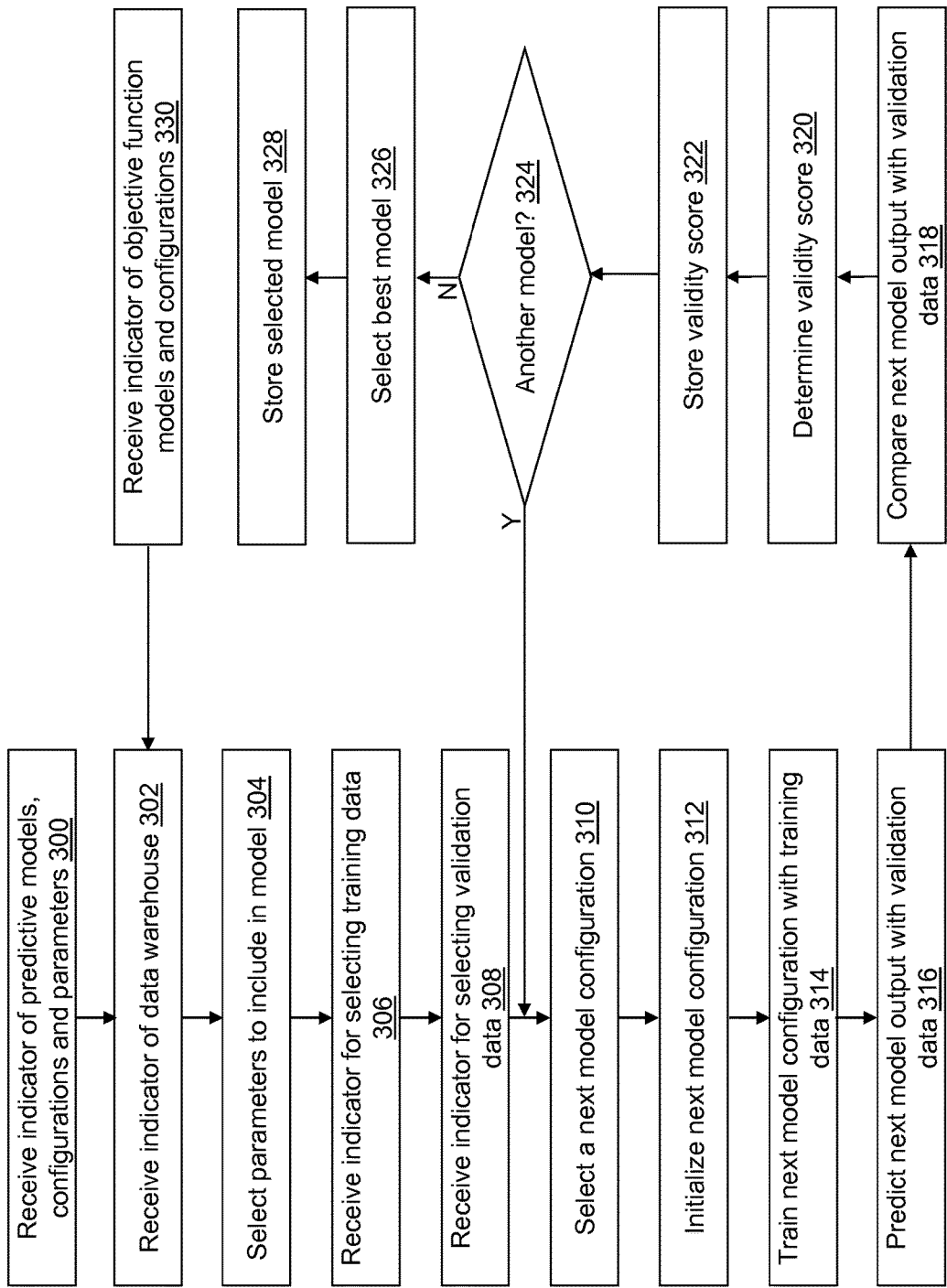
FIG. 3 depicts a flow diagram illustrating examples of operations performed by the model definition device of FIG. 2 in accordance with an illustrative embodiment.

Referring to FIG. 3, example operations associated with model definition application 222 are described. Model definition application 222 may be used to create objective function model 224 and/or one or more predictive model 225 using the data stored in data warehouse 112. Objective function model 224 supports a determination of an optimal value for a control of a drilling operation using sensed data measured during the drilling operation by the one or more drilling operation sensors 226 and/or using control settings for the one or more drilling operation control parameters 228 of the drilling operation. Predictive model 225 supports a determination of a predicted value for a control variable of the drilling operation using sensed data measured during the drilling operation by the one or more drilling operation sensors 226 and/or using control settings read for the one or more drilling operation control parameters 228 of the drilling operation.

Additional, fewer, or different operations may be performed depending on the embodiment. The order of presentation of the operations of FIG. 3 is not intended to be limiting. Although some of the operational flows are presented in sequence, the various operations may be performed in various repetitions, concurrently (in parallel, for example, using threads), and/or in other orders than those that are illustrated. For example, a user may execute model definition application 222, which causes presentation of a first user interface window, which may include a plurality of menus and selectors such as drop down menus, buttons, text boxes, hyperlinks, etc. associated with model definition application 222 as understood by a person of skill in the art. An indicator may indicate one or more user selections from a user interface, one or more data entries into a data field of the user interface, one or more data items read from computer-readable medium 208 or otherwise defined with one or more default values, etc. that are received as an input by model definition application 222.

In an operation 300, a first indicator of one or more types of predictive models, configurations, and one or more control variables to predict is received. Predictive models predict the values of one or more control variables (variables) in a data set from the values of other variables in the data set. For example, the first indicator indicates a name of a type of predictive model and a control variable to predict using that type of predictive model. One or more types of predictive models and configurations may be defined for a plurality of control variables to support prediction of the plurality of control variables independently or in combination, such as in sequence where a predicted control variable is an input to another predictive model for a different control variable of the one or more control variables. A name of a type of predictive model may be selectable for each of the plurality of control variables. Example control variables to predict include rate of penetration, mechanical specific energy, hook load, flow in fluid rate, flow out fluid rate, pump pressure, surface torque, rotation speed of the drill pipe, annular pressure, annular temperature, annular friction pressure, equivalent circulating density, etc.

For illustration, the name of a type of predictive model may be "Neural Network", "Linear Regression", "Non-linear Regression", Support Vector Machine", "Decision Tree", "Partial Least Squares", "Gradient Boosting", etc. A configuration identifies one or more initialization values based on the type of predictive model. For example, when the type of predictive model is indicated as "Neural Network", a number of hidden layers, a number of nodes per layer, a propagation method, etc. may be identified by the first indicator. A plurality of configurations may be defined. For example, when the type of predictive model is neural network, a range of numbers of hidden layers, a range of numbers of nodes per layer, etc. also may be identified by the first indicator.

For further illustration, the one or more control variables to predict and data in data warehouse 112 may be provided to SAS® Enterprise Miner™ for predictive modeling developed and provided by SAS Institute Inc. of Cary, N.C., USA. As an example, SAS® Enterprise Miner™ includes types of predictive models for neural networks (AutoNeural, DMNeural, Neural Network), decision trees (Decision Tree, Gradient Boosting), regression models (Dmine Regression, Least Angle Regressions (LARS), Regression), k-nearest neighbors models (Memory Based Reasoning (MBR)), a partial least squares model (Partial Least Squares), a support vector machine (Support Vector Machine), an ensemble of models that are integrated to define a predictive model (Ensemble), etc.

The first indicator may be received by model definition application 222 after selection from a user interface window or after entry by a user into a user interface window. A default value for the types of predictive models and configurations may further be stored, for example, in computer-readable medium 208. In an alternative embodiment, the types of predictive models and configurations and the one or more control variables to predict may not be selectable.

In an operation 302, a second indicator of data warehouse 112 is received. For example, the second indicator indicates a location of data warehouse 112. As an example, the second indicator may be received by model definition application 222 after selection from a user interface window or after entry by a user into a user interface window. In an alternative embodiment, data warehouse 112 may not be selectable. For example, a most recently created data warehouse may be used automatically.

As discussed previously, data warehouse 112 may be stored in a cube distributed across a grid of computers, may be stored in a multi-node Hadoop® cluster distributed across one or more computers, may be stored in a file system distributed across one or more computers, in a relational database, in one or more tables, in a structured query language database, etc.

In an operation 304, the data stored in data warehouse 112 is explored and mined to select control variables (input, independent variables) significant to a determination of a predictive model for each of the one or more control variables to predict. For example, in operation 304, the data stored in data warehouse 112 is reduced to obtain a minimal representation in dimension and volume as well as to retain a consistent variance and entropy for similar analytical results. Numerical data types may be discretized as understood by a person of skill in the art to simplify analytic processing.

Example data mining techniques include factor analysis, principal component analysis, correlation analysis, etc. as understood by a person of skill in the art. For illustration, SAS® Enterprise Miner™, developed and provided by SAS Institute Inc. of Cary, N.C., USA, includes nodes for exploring data and selecting or modifying control variables as input variables. Examples nodes include transformation nodes, clustering nodes, association rule nodes, a variable selection node, a descriptive statistics node, a principal components node, etc.

For example, the input variables with a highest degree of correlation relative to predicting each of the one or more control variables to predict may be selected. Example input variables include the hook load, the flow in fluid rate, the flow out fluid rate, the pump pressure, the surface torque, the rotation speed of a drill pipe, the annular pressure, the annular temperature, the annular volume, etc. The input variables further may include contextual variables such as a lithology, a fluid properties rheology, an applied electrical power, an applied hydraulic power, a bit type, a bottom hole assembly design, a temperature, etc. The input variables still further may include a geomechanical descriptive model, a prognosis lithology, a well construction plan, etc.

In an operation 306, a third indicator for selecting training data for the predictive model from data warehouse 112 is received. The third indicator may be received by model definition application 222, for example, after selection from a user interface window or after entry by a user into a user interface window. The third indicator identifies a first portion of the data stored in data warehouse 112 to use in training the predictive model. The third indicator may indicate a number of data points to include, a percentage of data points of the entire data warehouse 112 to include, etc. A subset may be created from data warehouse 112 by sampling. An example sampling algorithm is uniform sampling. Other random sampling algorithms may be used.

In an operation 308, a fourth indicator for selecting validation data for the predictive model from data warehouse 112 is received. The fourth indicator may be received by model definition application 222, for example, after selection from a user interface window or after entry by a user into a user interface window. The fourth indicator identifies a second portion of the data stored in data warehouse 112 to use in validating the predictive model. The fourth indicator may indicate a number of data points to include, a percentage of data points of the entire data warehouse 112 to include, etc. A subset may be created from data warehouse 112 by sampling. An example sampling algorithm is uniform sampling. Other random sampling algorithms may be used. The data points from data warehouse 112 selected for the validation data may be distinct from the data points from data warehouse 112 selected for the training data.

In an operation 310, a predictive model is selected based on the first indicator or based on a default model stored in computer-readable medium 208. In an operation 312, the selected predictive model is initialized. In an operation 314, the initialized predictive model is trained using the training data selected as indicated by the third indicator.

In an operation 316, output data is predicted with the validation data, selected as indicated by the fourth indicator, as an input to the trained predictive model. In an operation 318, the predicted output data is compared to the actual output data included with the validation data. In an operation 320, a validity score is determined based on the comparison. In an operation 322, the determined validity score is stored, for example, in computer-readable medium 208 in association with an indicator of the selected predictive model.

In an operation 324, a determination is made concerning whether or not there is another predictive model to evaluate. When there is another predictive model to evaluate, processing continues in operation 310. When there is not another predictive model to evaluate, processing continues in an operation 326. In operation 310, a next predictive model is selected based on the first indicator.

In operation 326, a best predictive model for each of the one or more control variables to predict is selected. For example, the validity scores stored for each iteration of operation 322 are compared and the predictive model associated with the best validity score is selected. The best validity score may be a minimum or a maximum value of the validity scores stored for each iteration of operation 322. For example, if the validity score is a misclassification rate, a minimum validity score indicates the best model; whereas, if the validity score is a correct classification rate, a maximum validity score indicates the best model.

In an operation 328, the selected best predictive model is stored, for example, in computer-readable medium 208. The selected predictive model may be stored in association with a specific drilling location, a specific drilling field, a specific type of drilling environment, etc. The selected predictive model is stored as predictive model 225. A different predictive model 225 may be defined for each of the one or more control variables to predict.

In an operation 330, a fifth indicator of one or more types of objective function models and configurations is received. The fifth indicator may indicate that the objective function model maximize the rate of penetration, minimize the mechanical specific energy, and/or optimize the wellbore stability. For example, the fifth indicator indicates a name of a type of objective function model and one or more control variables to maximize/minimize/optimize. For illustration, the name may be "Neural Network", "Linear Regression", "Non-linear Regression", "Support Vector Machine", "Decision Tree", "Partial Least Squares", "Gradient Boosting", etc. A configuration identifies one or more initialization values based on the type of objective function model. For example, when the type of objective function model is indicated as "Neural Network", a number of hidden layers, a number of nodes per layer, a propagation method, etc. may be identified by the first indicator. A plurality of configurations may be defined. For example, when the type of objective function model is neural network, a range of numbers of hidden layers, a range of numbers of nodes per layer, etc. also may be identified by the first indicator.

For example, SAS® Enterprise Miner™ includes types of objective function models for neural networks (AutoNeural, DMNeural, Neural Network), decision trees (Decision Tree, Gradient Boosting), regression models (Dmine Regression, Least Angle Regressions (LARS), Regression), k-nearest neighbors models (Memory Based Reasoning (MBR)), a partial least squares model (Partial Least Squares), a support vector machine (Support Vector Machine), an ensemble of models that are integrated to define an objective function model (Ensemble), etc.

As an example, SAS® Enterprise Miner™ includes a neural network procedure PROCNEURAL that can be used to configure, initialize, train, predict, and score a neural network model. The input nodes may be input variables such as the hook load, the flow in fluid rate, the flow out fluid rate, the pump pressure, the surface torque, the rotation speed of the drill pipe, the annular pressure, the bit type, the applied electrical power, the applied hydraulic power, and the well construction plan. The output node(s) may be predicted set points for controls of the flow in fluid rate, the flow out fluid rate, the surface torque, and the rotation speed of the drill pipe to maximize the rate of penetration, minimize the mechanical specific energy, and/or optimize the wellbore stability. For illustration, the objective function model may be implemented as a neural network with two or three hidden nodes, a feed-forward adaptation, a supervised learning mode, and back-propagation to perform sensitivity analysis that determines how each input variable influences the output node(s) to maximize the rate of penetration, minimize the mechanical specific energy, and/or optimize the wellbore stability.

The fifth indicator may be received by model definition application 222 after selection from a user interface window or after entry by a user into a user interface window. A default value for the types of objective function models and configurations may further be stored, for example, in computer-readable medium 208. In an alternative embodiment, the types of objective function models and configurations may not be selectable. Operations 302 to 328 are repeated with the predictive models replaced with the objective function models to select a best objective function model instead of a best predictive model. The selected best objective function model is stored as objective function model 224.

Cluster analysis of the data may be used to stratify actual results to evaluate predictive model 225 and/or objective function model 224 under working conditions. Cluster analysis may be used to select the variables in operation 304 and to select predictive model 225 and/or objective function model 224 in operation 326. The type of cluster analysis may be selected based on target geological and mechanical aspects of the wellbore plan. As an example, if drilling in pre-salt, the type of cluster analysis model may be different than one used while drilling in sand. Multiple neural networks may be used such that one neural network provides inputs to another neural network.

For illustration, a predictive model may be selected in operation 324 for a plurality of solutions such as mechanical specific energy, rate of penetration, and hydraulic wellbore stability. The predicted values for mechanical specific energy, rate of penetration, and hydraulic wellbore stability may be input to objective function models that determine optimal values for surface control input variables such as the hook load, the flow in fluid rate, the flow out fluid rate, the surface torque, the rotation speed of a drill pipe, and the annular pressure to achieve the predicted mechanical specific energy, rate of penetration, hydraulic wellbore stability, and equivalent circulating density.

Figure 4:
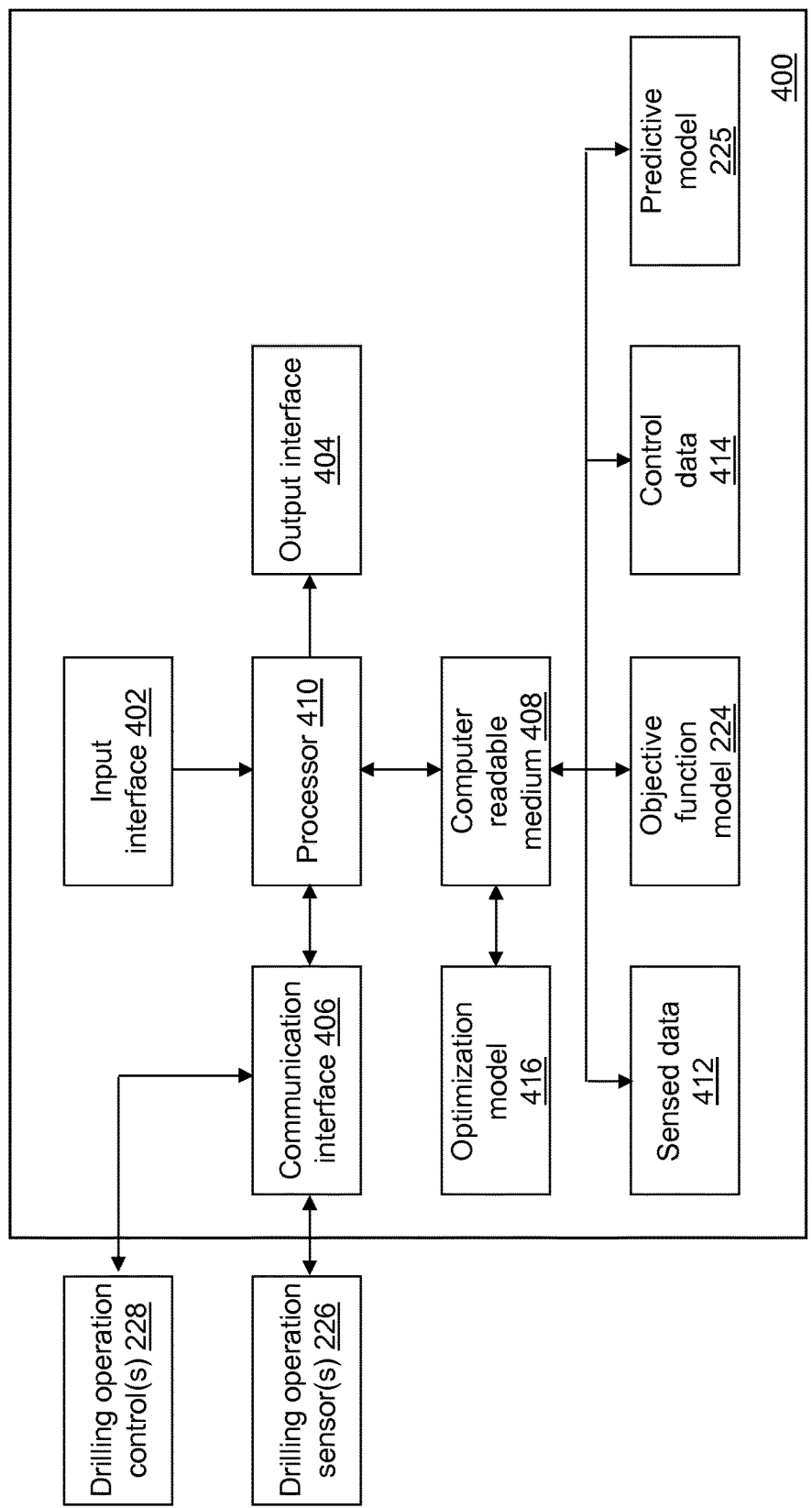
FIG. 4 depicts a further block diagram of an optimization device in accordance with an illustrative embodiment.

Referring to FIG. 4, a block diagram of an optimization device 400 is shown in accordance with an illustrative embodiment. Optimization device 400 may include a second input interface 402, a second output interface 404, a second communication interface 406, a second computer-readable medium 408, a second processor 410, predictive model 225, objective function model 224, control data 414, sensed data 412, and optimization model 416. Fewer, different, and/or additional components may be incorporated into optimization device 400.

After being selected using model definition device 200, predictive model 225 and/or objective function model 224 may be stored in second computer-readable medium 408 and/or accessed by optimization device 400 through second communication interface 406. Model definition device 200 and optimization device 400 may be integrated into the same computing device. Model definition device 200 and optimization device 400 may be different computing devices. Optimization device 400 may be located on a drilling rig of the plurality of drilling rigs 101 or remote from the plurality of drilling rigs 101. Optimization device 400 may be located on a drilling rig different from the plurality of drilling rigs 101 from which data is stored in data warehouse 112. Data generated by optimization device 400 may be stored in data warehouse 112 through second communication interface 406.

Second input interface 402 provides the same or similar functionality as that described with reference to input interface 202 of model definition device 200 though referring to optimization device 400. Second output interface 404 provides the same or similar functionality as that described with reference to output interface 204 of model definition device 200 though referring to optimization device 400. Second communication interface 406 provides the same or similar functionality as that described with reference to communication interface 206 of model definition device 200 though referring to optimization device 400. Data and messages may be transferred between optimization device 400 and drilling operation control(s) 228 and/or drilling operation sensor(s) 226 using second communication interface 406. Data and messages may be transferred between optimization device 400 and drilling operation control(s) 228 and/or drilling operation sensor(s) 226 using second input interface 402 and/or second output interface 404. Second computer-readable medium 408 provides the same or similar functionality as that described with reference to computer-readable medium 208 of model definition device 200 though referring to optimization device 400. Second processor 410 provides the same or similar functionality as that described with reference to processor 210 of model definition device 200 though referring to optimization device 400.

Optimization model 416 supports a determination of an optimal value for a control of the drilling operation using sensed data 412 measured during the drilling operation and control data 414 generated during the drilling operation. Some or all of the operations described herein may be embodied in optimization model 416. The operations of optimization model 416 may be implemented using hardware, firmware, software, or any combination of these methods. Referring to the example embodiment of FIG. 4, optimization model 416 is implemented in software (comprised of computer-readable and/or computer-executable instructions) stored in second computer-readable medium 408 and accessible by second processor 410 for execution of the instructions that embody the operations of optimization model 416. Optimization model 416 may be written using one or more programming languages, assembly languages, scripting languages, etc. Optimization model 416 may be implemented as a Web application.

Figure 5:
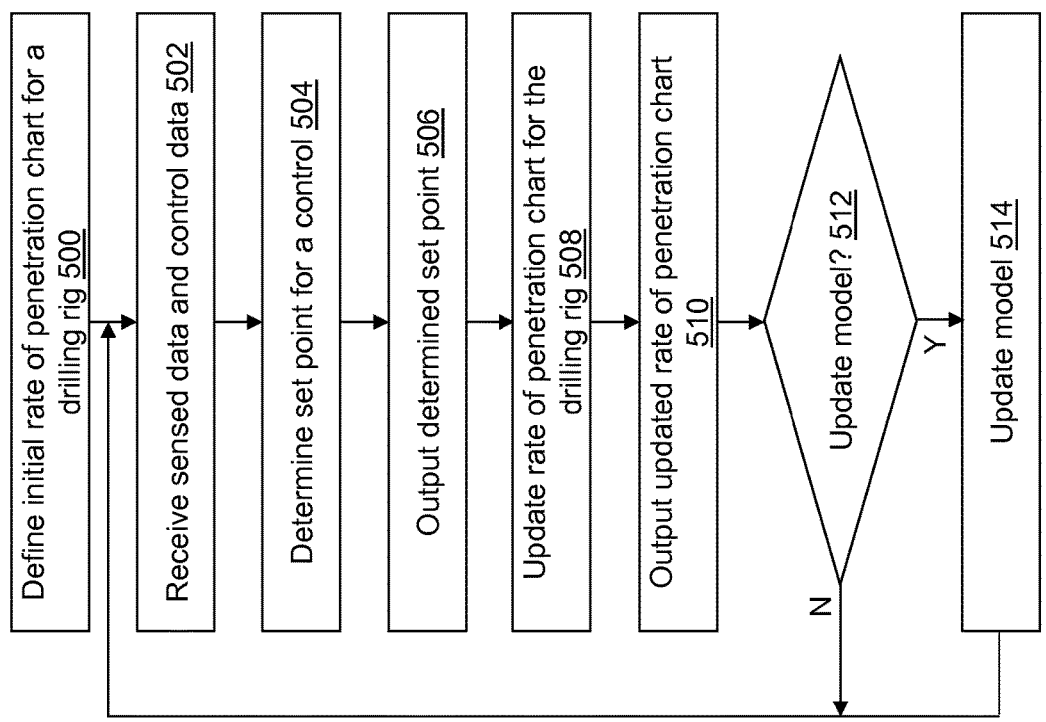
FIG. 5 depicts a flow diagram illustrating examples of operations performed by the optimization device of FIG. 4 in accordance with an illustrative embodiment.

Referring to FIG. 5, example operations associated with optimization model 416 are described. Additional, fewer, or different operations may be performed depending on the embodiment. The order of presentation of the operations of FIG. 5 is not intended to be limiting. Although some of the operational flows are presented in sequence, the various operations may be performed in various repetitions, concurrently (in parallel, for example, using threads), and/or in other orders than those that are illustrated.

In an operation 500, an initial rate of penetration chart is defined for a selected drilling rig. For example, input variables describing the drilling conditions expected to be encountered during the drilling process are input to predictive model 225 and/or objective function model 224 to define the initial rate of penetration chart.

Figure 6:
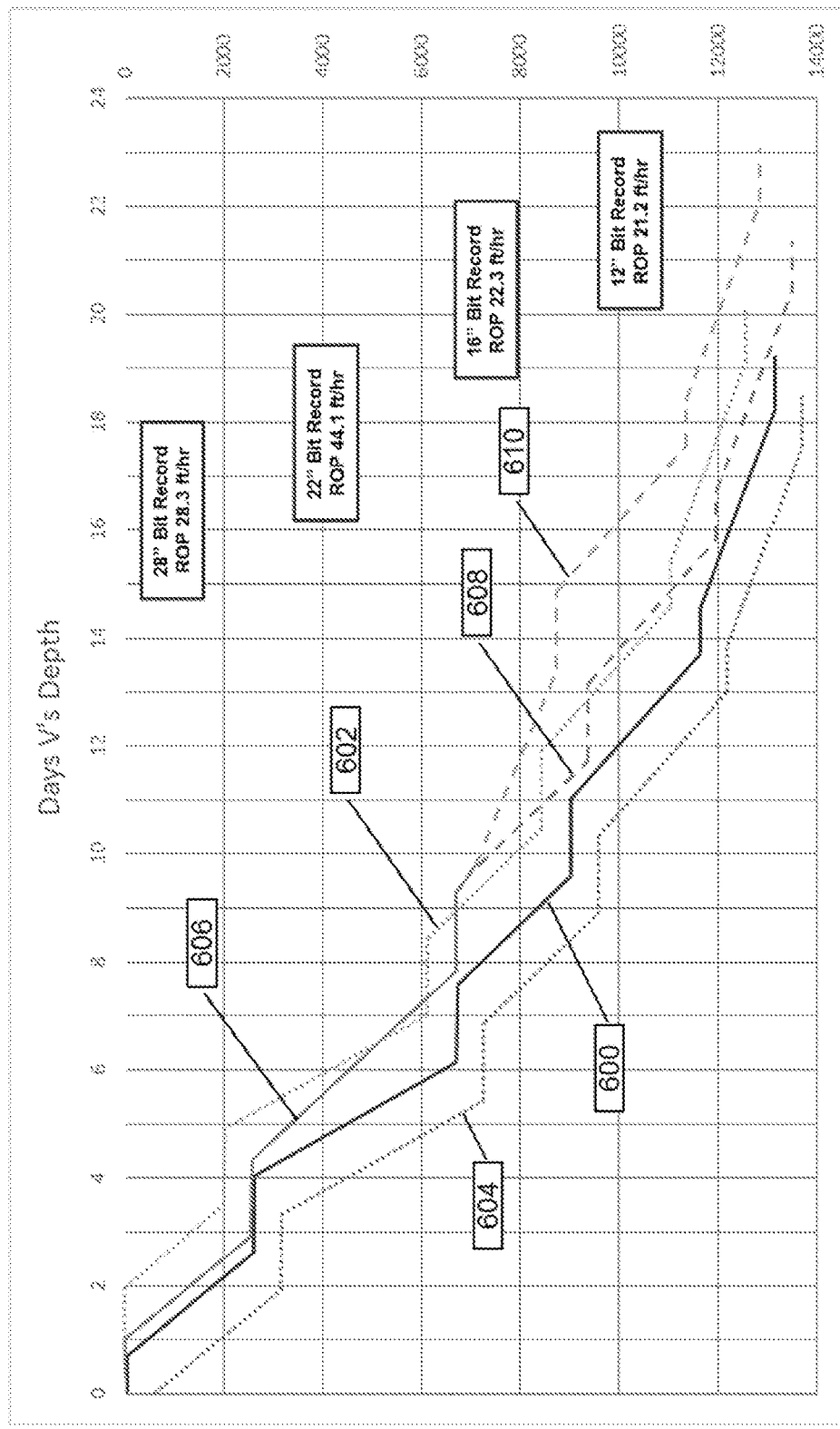
FIG. 6 depicts calculations related to a rate of penetration during a drilling operation in accordance with an illustrative embodiment.

Referring to FIG. 6, a rate of penetration chart is shown in accordance with an illustrative embodiment. The rate of penetration chart may include a planned rate of penetration (ROP) curve 600, an upper bound ROP curve 602, a lower bound ROP curve 604, an actual ROP curve 606, a predicted ROP curve 608, and an optimum ROP curve 610. Planned ROP curve 600 may be defined for the input variables describing the drilling conditions expected to be encountered during the drilling process input to optimization model 416. The rate of penetration chart shown in FIG. 6 represents a final ROP after drilling completion. The initial ROP chart may include planned ROP curve 600, upper bound ROP curve 602, and lower bound ROP curve 604.

Upper bound ROP curve 602 and lower bound ROP curve 604 may be computed using statistical probability limits. For illustration, upper bound ROP curve 602 and lower bound ROP curve 604 may be determined using Shewhart formulae as understood by those of skill in the art. Upper bound ROP curve 602 and lower bound ROP curve 604 may be associated with what are traditionally know to those skilled in the art as the "Western Electric rules" created by Dr. Shewhart for creating alerts.

Actual ROP curve 606 shows the actual ROP that resulted during the drilling operation from initiation to completion. Predicted ROP curve 608 shows the ROP predicted during the drilling operation using predictive model 225 that predicts the ROP. Predicted ROP curve 608 may be computed using a predictive model determined for the ROP. Optimum ROP curve 610 shows an optimum ROP determined using objective function model 224 in optimization model 416. Optimum ROP curve 610 may be computed using an optimization model determined for the ROP.

Referring again to FIG. 5, in an operation 502, control data 414 and sensed data 412 is received. For example, control data 414 and sensed data 412 associated with the input variables indicated in operation 304 are received in or near real-time from drilling operation control(s) 228 and from the drilling operation sensor(s) 226 indicating and measuring the current control variable values for the drilling operation, respectively.

In an operation 504, a set point for one or more controls of the drilling operation is determined by executing the selected objective function model with the received control data 414 and sensed data 412 as an input. The determined set point for the control variable seeks to maximize the rate of penetration, minimize the mechanical specific energy, and/or optimize the wellbore stability. As an example, SAS®OR, developed and provided by SAS Institute Inc. of Cary, N.C., USA, includes an OPTMODEL procedure that provides a framework for specifying and solving objective function model 224. Example controls include those that control the flow in fluid rate, the flow out fluid rate, the surface torque, and the rotation speed of the drill pipe for the drilling operation.

In an operation 506, the determined set point for the one or more controls of the drilling operation is output. For example, the determined set point for the one or more controls of the drilling operation may be output to display 216, speaker 218, and/or printer 220 for review by a user. As yet another example, the determined set point for the one or more controls of the drilling operation may be output to a control device associated with adjusting the set point of each control. When the determined set point is greater than a current set point for the control, the value for the control may be increased; whereas, when the determined set point is less than a current set point for the control, the value for the control may be reduced.

In an operation 508, predicted ROP curve 608 and optimum ROP curve 610 in the ROP chart are updated to reflect the changes in the predicted and optimal values based on the determined set point for the one or more controls of the drilling operation. In an operation 510, the updated ROP chart is output. For example, the updated ROP chart may be output to display 216 and/or printer 220 for review by a user.

In an operation 512, a determination is made concerning whether an update to objective function model 224 or to predictive model 225 for any of the control variables to predict is performed. An indicator may be received indicating that an update to one or more of the models be performed. For example, objective function model 224 and/or predictive model 225 may be updated periodically such as every second, minute, hour, day, week, month, year, etc. A timer may trigger receipt of the indicator. A user may trigger receipt of the indicator. For example, a user may monitor drilling control variables such as the updated ROP chart and determine that an update be performed. If the determination is to perform an update, processing continues in an operation 514 to update one or more of the models. If the determination is not to perform an update, processing continues in operation 502 to continue to process control data 414 and sensed data 412 as it is received in real-time.

In operation 514, the one or more models are updated for example, by updating the data stored in data warehouse 112 and repeating one or more of operations 302 to 328 for objective function model 224 and/or for predictive model 225. For example, operations 310 to 328 may be repeated. The data stored in data warehouse 112 in a previous iteration of operation 328, in addition to data measured and stored in data warehouse 112 subsequent to the last iteration of operation 328, may be used to update the one or more models.

Figure 7:
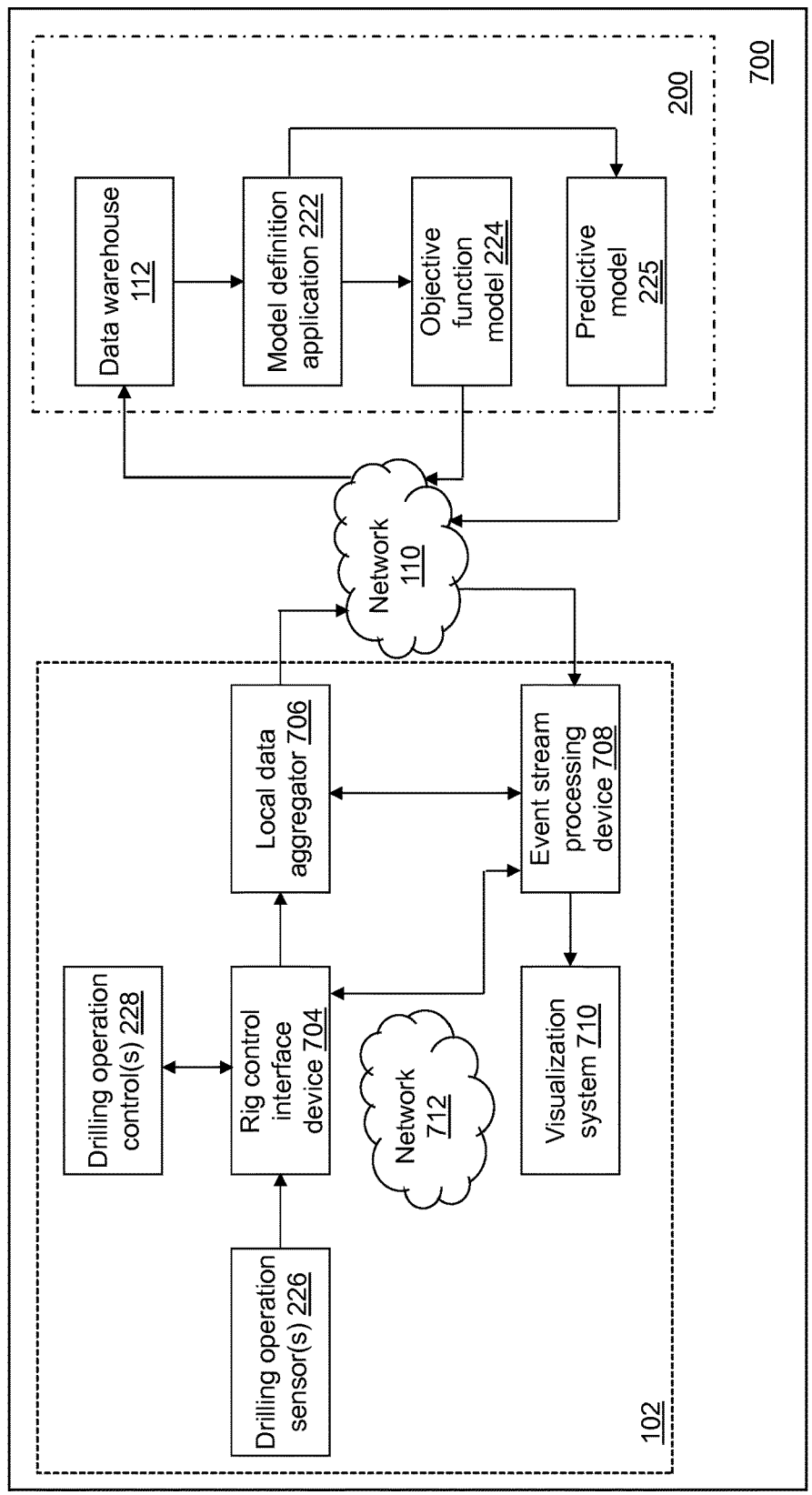
FIG. 7 depicts a block diagram of a distributed processing system in accordance with an illustrative embodiment.

Referring to FIG. 7, a block diagram of a drilling system 700 is shown in accordance with an illustrative embodiment. Drilling system 700 may include first drilling rig 102, network 110, and model definition device 200. Fewer, different, and/or additional components may be incorporated into drilling system 700. First drilling rig 102 may include the drilling operation sensors 226, the drilling operation control parameters 228 that generate control data 414, a rig control interface device 704, a local data aggregator 706, an event stream processing (ESP) device 708, a visualization system 710, and a second network 712. Rig control interface device 704 may be configured to receive data from the drilling operation sensors 226 and the drilling operation control parameters 228. The received data may be aggregated on pre-existing rig aggregators such as local data aggregator 706 as understood by a person of skill in the art. Visualization system 710 provides displays related to a current state of first drilling rig 102. For example, visualization system 710 may present the ROP chart of FIG. 6 to operators of first drilling rig 102 in addition to other current control set point values.

Second network 712 may include one or more networks of the same or different types. Second network 712 can be any type or combination of wired and/or wireless public or private network including a cellular network, a local area network, a wide area network such as the Internet, etc. Second network 712 further may comprise sub-networks and consist of any number of devices. Though connections through second network 712 are not explicitly shown in the illustrative embodiment of FIG. 7, one or more of the components of drilling system 700 may communicate using second network 712 that includes various transmission media that may be wired and/or wireless as understood by those skilled in the art. One or more of the components of drilling system 700 may be directly connected or integrated into one or more computing devices.

Figure 8:
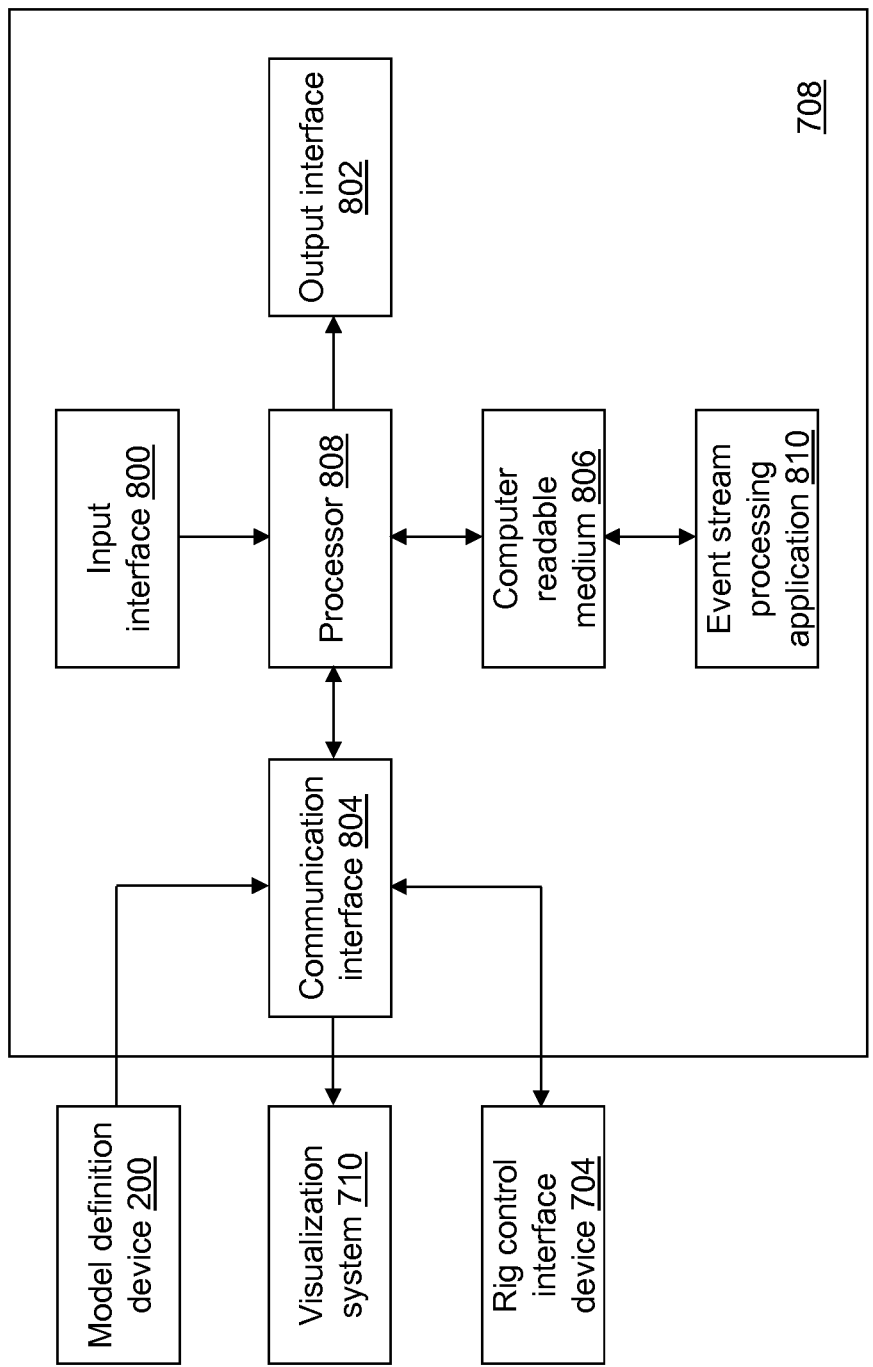
FIG. 8 depicts a block diagram of an event stream processing (ESP) device of the distributed processing system of FIG. 7 in accordance with an illustrative embodiment.

Referring to FIG. 8, a block diagram of ESP device 708 is shown in accordance with an illustrative embodiment. ESP device 708 may include a third input interface 800, a third output interface 802, a third communication interface 804, a third computer-readable medium 806, a third processor 808, and an ESP application 810. Fewer, different, and/or additional components may be incorporated into ESP device 708.

Third input interface 800 provides the same or similar functionality as that described with reference to input interface 202 of model definition device 200 though referring to ESP device 708. Third output interface 802 provides the same or similar functionality as that described with reference to output interface 204 of model definition device 200 though referring to ESP device 708. Third communication interface 804 provides the same or similar functionality as that described with reference to communication interface 206 of model definition device 200 though referring to ESP device 708. Data and messages may be transferred between ESP device 708 and model definition device 200, rig control interface device 704, and/or visualization system 710 using second communication interface 804. Third computer-readable medium 806 provides the same or similar functionality as that described with reference to computer-readable medium 208 of model definition device 200 though referring to ESP device 708. Third processor 808 provides the same or similar functionality as that described with reference to processor 210 of model definition device 200 though referring to ESP device 708.

ESP application 810 performs operations associated with executing the operations of optimization model 416 in or near real-time. Some or all of the operations described herein may be embodied in ESP application 810. The operations may be implemented using hardware, firmware, software, or any combination of these methods. Referring to the example embodiment of FIG. 8, ESP application 810 is implemented in software (comprised of computer-readable and/or computer-executable instructions) stored in third computer-readable medium 806 and accessible by third processor 808 for execution of the instructions that embody the operations of ESP application 810. ESP application 810 may be written using one or more programming languages, assembly languages, scripting languages, etc. ESP application 810 may be based on the Event Stream Processing Engine developed and provided by SAS Institute Inc. of Cary, N.C., USA.

Figure 9:
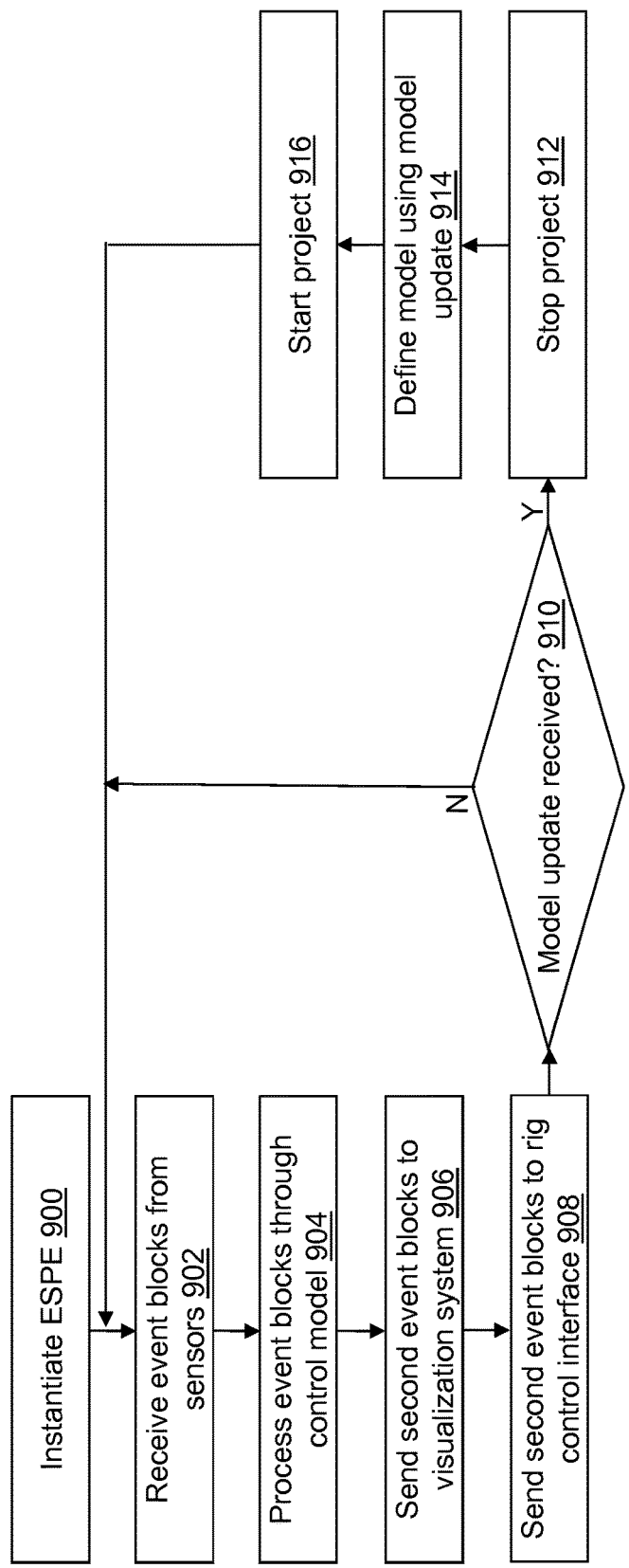
FIG. 9 depicts a flow diagram illustrating examples of operations performed by the ESP device of FIG. 8 in accordance with an illustrative embodiment.

Referring to FIG. 9, example operations associated with ESP application 810 are described. Additional, fewer, or different operations may be performed depending on the embodiment. The order of presentation of the operations of FIG. 9 is not intended to be limiting. Although some of the operational flows are presented in sequence, the various operations may be performed in various repetitions, concurrently (in parallel, for example, using threads), and/or in other orders than those that are illustrated.

In an operation 900, an ESP application instance is instantiated at ESP device 708. In an illustrative embodiment, an engine container is created, which instantiates an ESP engine (ESPE). The components of an ESPE executing at ESP device 708 may include one or more projects. A project may be described as a second-level container in a model managed by the ESPE where a thread pool size for the project may be defined by a user. The engine container is the top-level container in a model that manages the resources of the one or more projects. Each project of the one or more projects may include one or more continuous queries also referenced as a model. The one or more continuous queries may include one or more source windows and one or more derived windows. In an illustrative embodiment, for example, there can be only one ESPE for each instance of ESP application 810. ESPE may or may not be persistent.

Continuous query modeling involves defining directed graphs of windows for event stream manipulation and transformation. A continuous query may be described as a directed graph of source, relational, pattern matching, and procedural windows. The one or more source windows and the one or more derived windows represent continuously executing queries that generate updates to a query result set as new event blocks stream through ESPE.

An event object may be described as a packet of data accessible as a collection of fields, with at least one of the fields defined as a key or unique identifier (ID). The event object may be created using a variety of formats including binary, alphanumeric, XML, etc. Each event object may include one or more fields designated as a primary ID for the event so ESPE can support operation codes (opcodes) for events including insert, update, upsert, and delete. Upsert opcodes update the event if the key field already exists; otherwise, the event is inserted. For illustration, an event object may be a packed binary representation of a set of field values and include both metadata and field data associated with an event. The metadata may include an opcode indicating if the event represents an insert, update, delete, or upsert, a set of flags indicating if the event is a normal, partial-update, or a retention generated event from retention policy management, and a set of microsecond timestamps that can be used for latency measurements.

An event block object may be described as a grouping or package of event objects. An event stream may be described as a continuous flow of event block objects. A continuous query of the one or more continuous queries transforms a source event stream made up of streaming event block objects published into ESPE into one or more output event streams using the one or more source windows and the one or more derived windows. A continuous query can also be thought of as data flow modeling.

The one or more source windows are at the top of the directed graph and have no windows feeding into them.

Event streams are published into the one or more source windows, and from there, the event streams are directed to the next set of connected windows as defined by the created drilling model. The one or more derived windows are all instantiated windows that are not source windows and that have other windows streaming events into them. The one or more derived windows perform computations or transformations on the incoming event streams. The one or more derived windows transform event streams based on the window type (that is operators such as join, filter, compute, aggregate, copy, pattern match, procedural, union, etc.) and window settings. As event streams are published into the ESPE, they are continuously queried, and the resulting sets of derived windows in these queries are continuously updated.

The one or more continuous queries are instantiated by the ESPE as a model. For illustration, the one or more continuous queries may be defined to apply one or more of the operations of optimization model 416 (e.g., operations 504 and 508 of FIG. 5) within the ESPE to sensed data 412 and/or control data 414 that is streamed to ESP device 708 and to output the determined set point(s) and updated rate of penetration chart to visualization system 710 and/or to rig control interface device 704. To create a continuous query, input event structures that are schemas with keys that flow into the one or more source windows are identified. Output event structures that are also schemas with keys that will be generated by the one or more source windows and/or the one or more derived windows are also identified. The one or more source windows and the one or more derived windows are created based on the relational, pattern matching, and procedural algorithms that transform the input event streams into the output event streams.

The ESPE may analyze and process events in motion or "event streams." Instead of storing data and running queries against the stored data, the ESPE may store queries and stream data through them to allow continuous analysis of data as it is received.

A publish/subscribe (pub/sub) capability is initialized for the ESPE. In an illustrative embodiment, a pub/sub capability is initialized for each project of the one or more projects. To initialize and enable pub/sub capability for the ESPE, a port number is provided. Pub/sub clients use the port number to establish pub/sub connections to the ESPE. The one or more continuous queries instantiated by the ESPE analyze and process the input event streams to form output event streams output to event subscribing device(s).

A pub/sub application programming interface (API) may be described as a library that enables an event publisher, such as rig control interface device 704, local data aggregator 706 and/or model definition device 200, to publish event streams into the ESPE or an event subscriber, such as visualization system 710 and rig control interface device 704, to subscribe to event streams from the ESPE. The pub/sub API provides cross-platform connectivity and endianness compatibility between ESP application 810 and other networked applications. The pub/sub API may include an ESP object support library so the event publisher or the event subscriber can create or manipulate the events they send or receive, respectively. For example, rig control interface device 704 may use the pub/sub API to send a stream of event blocks (event block objects) into the ESPE, and visualization system 710 may use the pub/sub API to receive a stream of event blocks from the ESPE.

In an operation 902, one or more event blocks are received by the ESPE that include control data 414 and/or sensed data 412. An event block object containing one or more event objects is injected into a source window of the one or more source windows.

In an operation 904, the event blocks are processed through the one or more operations of optimization model 416 executed within the ESPE. In an operation 906, second event blocks are sent to visualization system 710. For example, the rate of penetration chart may be updated and output in one or more event blocks sent to visualization system 710 for review by an operator.

As another example, a control value may be calculated and output in one or more event blocks and sent, in an operation 908, to rig control interface device 704, which may control a change in a set point of a control of the drilling operation control parameters 228.

Similar to operation 512, in an operation 910, a determination is made concerning whether an update to objective function model 224 or to predictive model 225 for any of the control variables to predict is performed. If the determination is to perform an update, processing continues in an operation 912. If the determination is not to perform an update, processing continues in operation 902 to continue to process control data 414 and sensed data 412 as it is received in real-time.

In operation 912, the project is stopped. In an operation 914, objective function model 224 and/or predictive model 225 of optimization model 416 are updated from model definition device 200. In an operation 916, the project in the ESPE is restarted with the updated optimization model 416 received from model definition device 200, and processing continues in operation 902 to continue to process control data 414 and sensed data 412 as it is received in real-time.

The word "illustrative" is used herein to mean serving as an example, instance, or illustration. Any aspect or design described herein as "illustrative" is not necessarily to be construed as preferred or advantageous over other aspects or designs. Further, for the purposes of this disclosure and unless otherwise specified, "a" or "an" means "one or more". Still further, using "and" or "or" in the detailed description is intended to include "and/or" unless specifically indicated otherwise. The illustrative embodiments may be implemented as a method, apparatus, or article of manufacture using standard programming and/or engineering techniques to produce software, firmware, hardware, or any combination thereof to control a computer to implement the disclosed embodiments.

The foregoing description of illustrative embodiments of the disclosed subject matter has been presented for purposes of illustration and of description. It is not intended to be exhaustive or to limit the disclosed subject matter to the precise form disclosed, and modifications and variations are possible in light of the above teachings or may be acquired from practice of the disclosed subject matter. The embodiments were chosen and described in order to explain the principles of the disclosed subject matter and as practical applications of the disclosed subject matter to enable one skilled in the art to utilize the disclosed subject matter in various embodiments and with various modifications as suited to the particular use contemplated.

What is claimed is:

1. A non-transitory computer-readable medium having stored thereon computer-readable instructions that when executed by a computing device cause the computing device to:

instantiate an event stream processing engine (ESPE) at a computing device, wherein the ESPE is instantiated to execute an objective function model determined using historical drilling data, wherein the objective function model maximizes a rate of penetration for a previous drilling operation, wherein the historical drilling data includes a plurality of values measured for each of a plurality of drilling control variables during the previous drilling operation;

receive measured drilling data that includes drilling data values from an active drilling operation;

process the received, measured drilling data through the ESPE instantiated to execute the objective function model to compute a value for a control of the active drilling operation;

output the computed value to control the active drilling operation;

stop the instantiated ESPE;

instantiate a second ESPE at the computing device, wherein the second ESPE is instantiated to execute a second objective function model determined using additional drilling data that includes a second plurality of values measured for each of the plurality of drilling control variables, wherein the second objective function model maximizes the rate of penetration for the previous drilling operation, wherein the additional drilling data is measured after outputting the computed value to control the active drilling operation;

receive second measured drilling data that includes second drilling data values from the active drilling operation;

process the received, second measured drilling data through the second ESPE instantiated to execute the second objective function model to compute a second value for the control of the active drilling operation; and output the computed second value to control the active drilling operation.

2. The non-transitory computer-readable medium of claim 1, wherein the computer-readable instructions further cause the computing device to receive the objective function model from a second computing device remote from the computing device.

3. The non-transitory computer-readable medium of claim 1, wherein the objective function model is determined by evaluating a plurality of neural network model configurations.

4. The non-transitory computer-readable medium of claim 1, wherein a predictive model is determined using the historical drilling data, wherein the predictive model predicts a value of a control variable input to the objective function model.

5. The non-transitory computer-readable medium of claim 4, wherein the ESPE is further instantiated to execute the predictive model to provide the predicted value as an input to the objective function model.

6. The non-transitory computer-readable medium of claim 5, wherein the computer-readable instructions further cause the computing device to receive the predictive model from a second computing device remote from the computing device.

7. The non-transitory computer-readable medium of claim 4, wherein the predictive model is determined using a decision tree model.

8. The non-transitory computer-readable medium of claim 1, wherein the second objective function model further maximizes the rate of penetration for the active drilling operation.

9. The non-transitory computer-readable medium of claim 8, wherein the received additional drilling data includes a second plurality of values measured for each of the plurality of drilling control variables during the active drilling operation.

10. The non-transitory computer-readable medium of claim 8, wherein the computer-readable instructions further cause the computing device to receive the second objective function model from a second computing device remote from the computing device.

11. The non-transitory computer-readable medium of claim 1, wherein the objective function model further minimizes a mechanical specific energy for the previous drilling operation.

12. The non-transitory computer-readable medium of claim 1, wherein the additional drilling data further includes the measured drilling data received from the active drilling operation.

13. The non-transitory computer-readable medium of claim 1, wherein the computed value is output to a display device.

14. The non-transitory computer-readable medium of claim 1, wherein the computed value is output to a control device associated with adjusting a set point of the control.

15. A computing device comprising:

a processor; and a non-transitory computer-readable medium operably coupled to the processor, the computer-readable medium having computer-readable instructions stored thereon that, when executed by the processor, cause the computing device to instantiate an event stream processing engine (ESPE) at the computing device, wherein the ESPE is instantiated to execute an objective function model determined using historical drilling data, wherein the objective function model maximizes a rate of penetration for a previous drilling operation, wherein the historical drilling data includes a plurality of values measured for each of a plurality of drilling control variables during the previous drilling operation;

receive measured drilling data that includes drilling data values from an active drilling operation;

process the received, measured drilling data through the ESPE instantiated to execute the objective function model to compute a value for a control of the active drilling operation;

output the computed value to control the active drilling operation;

stop the instantiated ESPE;

instantiate a second ESPE at the computing device, wherein the second ESPE is instantiated to execute a second objective function model determined using additional drilling data that includes a second plurality of values measured for each of the plurality of drilling control variables, wherein the second objective function model maximizes the rate of penetration for the previous drilling operation, wherein the additional drilling data is measured after outputting the computed value to control the active drilling operation;

receive second measured drilling data that includes second drilling data values from the active drilling operation;

process the received, second measured drilling data through the second ESPE instantiated to execute the second objective function model to compute a second value for the control of the active drilling operation; and output the computed second value to control the active drilling operation.

16. The computing device of claim 15, wherein the second objective function model further maximizes the rate of penetration for the active drilling operation.

17. The computing device of claim 16, wherein the computer-readable instructions further cause the computing device to receive the second objective function model from a second computing device remote from the computing device.

18. The computing device of claim 15, wherein a predictive model is determined using the received drilling data, wherein the predictive model predicts a value of a control variable input to the determined objective function model.

19. The computing device of claim 18, wherein the ESPE is further instantiated to execute the predictive model to provide the predicted value as an input to the objective function model.

20. The computing device of claim 18, wherein the computer-readable instructions further cause the computing device to receive the predictive model from a second computing device remote from the computing device.

21. The computing device of claim 15, wherein the computer-readable instructions further cause the computing device to receive the objective function model from a second computing device remote from the computing device.

22. The computing device of claim 15, wherein the computed optimal value is output to a control device associated with adjusting a set point of the control.

23. A method of determining an optimal value for a control of a drilling operation, the method comprising:
   instantiating an event stream processing engine (ESPE) at a computing device, wherein the ESPE is instantiated to execute an objective function model determined using historical drilling data, wherein the objective function model maximizes a rate of penetration for a previous drilling operation, wherein the historical drilling data includes a plurality of values measured for each of a plurality of drilling control variables during the previous drilling operation;
   receiving, by the ESPE, measured drilling data that includes drilling data values from an active drilling operation;
   processing the received, measured drilling data through the ESPE instantiated to execute the objective function model to compute a value for a control of the active drilling operation;
   outputting, by the ESPE, the computed value to control the active drilling operation;
   stop the instantiated ESPE;
   instantiate a second ESPE at the computing device, wherein the second ESPE is instantiated to execute a second objective function model determined using additional drilling data that includes a second plurality of values measured for each of the plurality of drilling control variables, wherein the second objective function model maximizes the rate of penetration for the previous drilling operation, wherein the additional drilling data is measured after outputting the computed value to control the active drilling operation;
   receiving, by the second ESPE, second measured drilling data that includes second drilling data values from the active drilling operation;
   process the received, second measured drilling data through the second ESPE instantiated to execute the second objective function model to compute a second value for the control of the active drilling operation; and
   outputting, by the second ESPE, the computed second value to control the active drilling operation.

24. The method of claim 23, wherein the second objective function model further maximizes the rate of penetration for the active drilling operation.

25. The method of claim 24, further comprising receiving the second objective function model from a second computing device remote from the computing device.

26. The method of claim 23, wherein a predictive model is determined using the received drilling data, wherein the predictive model predicts a value of a control variable input to the determined objective function model.

27. The method of claim 26, wherein the ESPE is further instantiated to execute the predictive model to provide the predicted value as an input to the objective function model.

28. The method of claim 26, further comprising receiving the predictive model from a second computing device remote from the computing device.

29. The method of claim 23, further comprising receiving the objective function model from a second computing device remote from the computing device.

30. The method of claim 23, wherein the computed optimal value is output to a control device associated with adjusting a set point of the control.

* * * * *